(12) United States Patent
Yuza et al.

(10) Patent No.: US 12,392,996 B2
(45) Date of Patent: Aug. 19, 2025

(54) IMAGING LENS

(71) Applicant: TOKYO VISIONARY OPTICS CO., LTD., Tokyo (JP)

(72) Inventors: Shingo Yuza, Sukagawa (JP); Hisao Fukaya, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 0 days.

(21) Appl. No.: 16/983,494

(22) Filed: Aug. 3, 2020

(65) Prior Publication Data

US 2021/0191079 A1 Jun. 24, 2021

(30) Foreign Application Priority Data

Aug. 1, 2019 (JP) ................. 2019-141898

(51) Int. Cl.
| | |
|---|---|
| *G02B 13/00* | (2006.01) |
| *G02B 9/34* | (2006.01) |
| *G02B 13/06* | (2006.01) |
| *G02B 27/00* | (2006.01) |
| *H04N 23/45* | (2023.01) |
| *H04N 23/55* | (2023.01) |

(52) U.S. Cl.
CPC ............ *G02B 13/004* (2013.01); *G02B 9/34* (2013.01); *G02B 13/06* (2013.01); *G02B 27/0025* (2013.01); *H04N 23/45* (2023.01); *H04N 23/55* (2023.01)

(58) Field of Classification Search
CPC .......... G02B 9/34; G02B 9/65; G02B 13/004; G02B 13/06; G02B 13/18; G02B 15/144513; G02B 27/0025; G02B 9/56; G02B 15/144515; G02B 27/00; G02B 13/00; G02B 9/16; H04N 5/2258; H04N 23/45; H04N 23/55
USPC .................................................. 359/715, 781
See application file for complete search history.

(56) References Cited

U.S. PATENT DOCUMENTS

| | | | |
|---|---|---|---|
| 8,531,578 B2 * | 9/2013 | Matsusaka | G02B 13/004 359/740 |
| 11,163,134 B2 * | 11/2021 | Yeh | G02B 27/0955 |
| 2011/0242683 A1 * | 10/2011 | Yamakawa | G02B 13/04 359/715 |
| 2014/0111850 A1 | 4/2014 | Huang et al. | |

(Continued)

FOREIGN PATENT DOCUMENTS

| | | |
|---|---|---|
| JP | S59195211 A | 11/1984 |
| JP | 2013109052 A | 6/2013 |
| JP | 2018-013580 A | 1/2018 |

*Primary Examiner* — Thomas K Pham
*Assistant Examiner* — Kuei-Jen L Edenfield
(74) *Attorney, Agent, or Firm* — Maine Cernota & Curran

(57) ABSTRACT

There is provided an imaging lens with excellent optical characteristics while satisfying demand of wide field of view. An imaging lens comprises, in order from an object side to an image side, a first lens with negative refractive power in a paraxial region, a second lens with positive or negative refractive power having an object-side surface being concave in a paraxial region, a third lens with positive refractive power having a biconvex shape with convex surfaces on the object side and the image side in a paraxial region, and a fourth lens with positive refractive power having an image-side surface being convex in a paraxial region, and predetermined conditional expressions are satisfied.

6 Claims, 3 Drawing Sheets

(56) References Cited

U.S. PATENT DOCUMENTS

2014/0153116 A1* 6/2014 Kubota .............. G02B 27/0025
  359/783
2018/0024320 A1 1/2018 Asami et al.
2019/0121127 A1* 4/2019 Jia .......................... G02B 13/18

* cited by examiner

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function forming an image using near-infrared ray is mounted in various products, such as automobiles, biometrics, night-vision monitors, and the like. Development of products with the camera function will be made accordingly.

The imaging lens mounted in such equipment is required to have a wide field of view and high-resolution performance.

As a conventional imaging lens aiming high performance, for example, the imaging lens disclosed in the following Patent Document 1 has been known.

Patent Document 1 (JP2018-13580A) discloses an imaging lens comprising, in order from an object side, a first lens with positive refractive power, a second lens with negative refractive power, a third lens with positive refractive power, and a fourth lens with positive refractive power, and a relationship between a focal length of the first lens with respect to S-line and a focal length of the overall optical system with respect to S-line satisfies a certain condition.

SUMMARY OF THE INVENTION

However, in lens configurations disclosed in the Patent Document 1, when a wide field of view is to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with negative refractive power in a paraxial region, a second lens with positive or negative refractive power having an object-side surface being concave in a paraxial region, a third lens with positive refractive power having a biconvex shape with convex surfaces on the object side and the image side in a paraxial region, and a fourth lens with positive refractive power having an image-side surface being convex in a paraxial region.

According to the imaging lens having an above-described configuration, the first lens has the negative refractive power and achieves a wide field of view.

The second lens properly corrects coma aberration, field curvature and distortion. When the second lens has the object-side surface being concave in the paraxial region, the distortion is more properly corrected.

The third lens achieves reduction in a profile, and spherical aberration, astigmatism and the distortion are properly corrected.

The fourth lens properly corrects the coma aberration, the astigmatism, the field curvature and the distortion. When the fourth lens has the image-side surface being convex in the paraxial region, a light ray incident angle to an image sensor can be appropriately controlled. As a result, a lens diameter of the fourth lens can be small and reduction in the diameter of the imaging lens can be achieved.

According to the imaging lens having the above-described configuration, it is preferable that the following conditional expression (1) is satisfied:

$$1.60 < |r4|/T2 \tag{1}$$

where
r4: a paraxial curvature radius of an image-side surface of the second lens, and
T2: a distance along the optical axis from an image-side surface of the second lens to an object-side surface of the third lens.

The conditional expression (1) defines an appropriate range of a relationship between the paraxial curvature radius of the image-side surface of the second lens and the distance along the optical axis from the image-side surface of the second lens to the object-side surface of the third lens. By satisfying the conditional expression (1), refractive power of the image-side surface of the second lens can be maintained, a light ray incident angle to an object-side surface of the third lens can be appropriately controlled, and the distortion can be properly corrected.

According to the imaging lens having the above-described configuration, it is preferable that the following conditional expression (2) is satisfied:

$$2.10 < r5/f < 5.50 \tag{2}$$

where
r5: a paraxial curvature radius of an object-side surface of the third lens, and
f: a focal length of the overall optical system of the imaging lens.

The conditional expression (2) defines an appropriate range of the paraxial curvature radius of the object-side surface of the third lens. By satisfying the conditional expression (2), the spherical aberration, the astigmatism and the distortion can be properly corrected.

According to the imaging lens having the above-described configuration, it is preferable that the following conditional expression (3) is satisfied:

$$-1.40 < f1/f4 < -0.01 \tag{3}$$

where
f1: a focal length of the first lens, and
f4: a focal length of the fourth lens.

The conditional expression (3) defines an appropriate range of a relationship between the focal length of the first lens and the focal length of the fourth lens. By satisfying the conditional expression (3), refractive powers of the first lens and the fourth lens can be appropriately balanced. As a result, chromatic aberration, the coma aberration, the astigmatism, the field curvature and the distortion can be properly corrected.

According to the imaging lens having the above-described configuration, it is preferable that the following conditional expression (4) is satisfied:

$$2.85 < D3/T3 < 12.00 \tag{4}$$

where
- D3: a thickness along the optical axis of the third lens, and
- T3: a distance along the optical axis from an image-side surface of the third lens to an object-side surface of the fourth lens.

The conditional expression (4) defines an appropriate range of a relationship between the thickness along the optical axis of the third lens, and the distance along the optical axis from an image-side surface of the third lens to an object-side surface of the fourth lens. By satisfying the conditional expression (4), reduction in the profile can be achieved, a light ray incident angle to an object-side surface of the fourth lens can be appropriately controlled, and the coma aberration, the astigmatism and the distortion can be properly corrected.

According to the imaging lens having the above-described configuration, it is preferable that the following conditional expression (5) is satisfied:

$$-3.50 < r3/|r4| < -0.10 \tag{5}$$

where
- r3: a paraxial curvature radius of an object-side surface of the second lens, and
- r4: a paraxial curvature radius of an image-side surface of the second lens.

The conditional expression (5) defines an appropriate range of a relationship between the paraxial curvature radius of the object-side surface of the second lens and the paraxial curvature radius of the image-side surface of the second lens. By satisfying the conditional expression (5), the coma aberration, the field curvature and the distortion can be properly corrected.

According to the imaging lens having the above-described configuration, it is preferable that the following conditional expression (6) is satisfied:

$$0.70 < |r7|/f < 5.50 \tag{6}$$

where
- r7: a paraxial curvature radius of an object-side surface of the fourth lens, and
- f: a focal length of the overall optical system of the imaging lens.

The conditional expression (6) defines an appropriate range of the paraxial curvature radius of the object-side surface of the fourth lens. By satisfying the conditional expression (6), the coma aberration, the astigmatism and the distortion can be properly corrected.

According to the imaging lens having the above-described configuration, it is preferable that the following conditional expression (7) is satisfied:

$$0.30 < |r7|/(T3+bf) < 2.20 \tag{7}$$

where
- r7: a paraxial curvature radius of an object-side surface of the fourth lens,
- T3: a distance along the optical axis from an image-side surface of the third lens to an object-side surface of the fourth lens, and
- bf: a back focus.

The conditional expression (7) defines an appropriate range of a relationship among the paraxial curvature radius of the object-side surface of the fourth lens, the distance along the optical axis from an image-side surface of the third lens to an object-side surface of the fourth lens and the back focus. By satisfying the conditional expression (7), refractive power of the object-side surface of the fourth lens can be maintained, the fourth lens is arranged at an optimum position, and aberration correction function of the lens becomes more effective. As a result, the coma aberration, the astigmatism, the field curvature and the distortion can be properly corrected.

According to the imaging lens having the above-described configuration, it is preferable that the following conditional expression (8) is satisfied:

$$-1.00 < r2/r8 < -0.10 \tag{8}$$

where
- r2: a paraxial curvature radius of an image-side surface of the first lens, and
- r8: a paraxial curvature radius of an image-side surface of the fourth lens.

The conditional expression (8) defines an appropriate range of a relationship between the paraxial curvature radius of the image-side surface of the first lens and the paraxial curvature radius of the image-side surface of the fourth lens. By satisfying the conditional expression (8), the coma aberration, the astigmatism, the field curvature and the distortion can be properly corrected.

According to the imaging lens having the above-described configuration, it is preferable that the following conditional expression (9) is satisfied:

$$8.00 < (T3/f) \times 100 < 40.00 \tag{9}$$

where
- T3: a distance along the optical axis from an image-side surface of the third lens to an object-side surface of the fourth lens, and
- f: a focal length of the overall optical system of the imaging lens.

The conditional expression (9) defines an appropriate range of the distance along the optical axis from the image-side surface of the third lens to the object-side surface of the fourth lens. By satisfying the conditional expression (9), reduction in the profile can be achieved, a light ray incident angle to the object-side surface of the fourth lens can be appropriately controlled, and the astigmatism and the distortion can be properly corrected.

According to the imaging lens having the above-described configuration, it is preferable that the following conditional expression (10) is satisfied:

$$0.40 < r2/f < 2.50 \tag{10}$$

where
- r2: a paraxial curvature radius of an image-side surface of the first lens, and
- f: a focal length of the overall optical system of the imaging lens.

The conditional expression (10) defines an appropriate range of the paraxial curvature radius of the image-side surface of the first lens. By satisfying the conditional expression (10), the distortion can be properly corrected.

According to the imaging lens having the above-described configuration, it is preferable that the following conditional expression (11) is satisfied:

$$-6.50 < r3/f < -1.40 \tag{11}$$

where r3: a paraxial curvature radius of an object-side surface of the second lens, and f: a focal length of the overall optical system of the imaging lens.

The conditional expression (11) defines an appropriate range of the paraxial curvature radius of the object-side surface of the second lens. By satisfying the conditional expression (11), the coma aberration, the field curvature and the distortion can be properly corrected.

According to the imaging lens having the above-described configuration, it is preferable that the following conditional expression (12) is satisfied:

$$-5.20 < r3/|r7| < -0.50 \qquad (12)$$

where r3: a paraxial curvature radius of an object-side surface of the second lens, and r7: a paraxial curvature radius of an object-side surface of the fourth lens.

The conditional expression (12) defines an appropriate range of a relationship between the paraxial curvature radius of the object-side surface of the second lens and the paraxial curvature radius of the object-side surface of the fourth lens. By satisfying the conditional expression (12), the coma aberration, the astigmatism, the field curvature and the distortion can be properly corrected.

According to the imaging lens having the above-described configuration, it is preferable that the following conditional expression (13) is satisfied:

$$10.00 < r5/T3 < 28.50 \qquad (13)$$

where r5: a paraxial curvature radius of an object-side surface of the third lens, and T3: a distance along the optical axis from an image-side surface of the third lens to an object-side surface of the fourth lens.

The conditional expression (13) defines an appropriate range of a relationship between the paraxial curvature radius of the object-side surface of the third lens and the distance along the optical axis from the image-side surface of the third lens to the object-side surface of the fourth lens. By satisfying the conditional expression (13), refractive power of the object-side surface of the third lens can be maintained, a light ray incident angle to an object-side surface of the fourth lens can be appropriately controlled, and the spherical aberration, the astigmatism and the distortion can be properly corrected.

According to the imaging lens having the above-described configuration, it is preferable that the following conditional expression (14) is satisfied:

$$-3.00 < |r7|/r8 < -0.10 \qquad (14)$$

where r7: a paraxial curvature radius of an object-side surface of the fourth lens, and r8: a paraxial curvature radius of an image-side surface of the fourth.

The conditional expression (14) defines an appropriate range of a relationship between the paraxial curvature radius of the object-side surface of the fourth lens and the paraxial curvature radius of the image-side surface of the fourth lens. By satisfying the conditional expression (14), the coma aberration, the astigmatism, the field curvature and the distortion can be properly corrected.

According to the imaging lens having the above-described configuration, it is preferable that the following conditional expression (15) is satisfied:

$$r8/D4 < -1.50 \qquad (15)$$

where r8: a paraxial curvature radius of an image-side surface of the fourth lens, and D4: a thickness along the optical axis of the fourth lens.

The conditional expression (15) defines an appropriate range of a relationship between the paraxial curvature radius of an image-side surface of the fourth lens and the thickness along the optical axis of the fourth lens. By satisfying the conditional expression (15), reduction in the profile can be achieved, and the coma aberration, the astigmatism, the field curvature and the distortion can be properly corrected.

According to the imaging lens having the above-described configuration, it is preferable that the following conditional expression (16) is satisfied:

$$-5.00 < f1/f < -0.90 \qquad (16)$$

where f1: a focal length of the first lens, and f: a focal length of the overall optical system of the imaging lens.

The conditional expression (16) defines an appropriate range of the focal length of the first lens. By satisfying the conditional expression (16), the chromatic aberration and the distortion can be properly corrected.

According to the imaging lens having the above-described configuration, it is preferable that the following conditional expression (17) is satisfied:

$$-1.20 < f1/|f2| < -0.15 \qquad (17)$$

where f1: a focal length of the first lens, and f2: a focal length of the second lens.

The conditional expression (17) defines an appropriate range of a relationship between the focal length of the first lens and the focal length of the second lens. By satisfying the conditional expression (17), refractive powers of the first lens and the second lens can be appropriately balanced. As a result, the chromatic aberration, the coma aberration, the field curvature and the distortion can be properly corrected.

Effect of Invention

According to the present invention, there can be provided an imaging lens with high resolution which satisfies demand of the wide field of view and properly corrects aberrations.

DETAILED DESCRIPTION OF THE PREFERRED EMBODIMENT

Hereinafter, the preferred embodiment of the present invention will be described in detail referring to the accompanying drawings.

Figure 1:
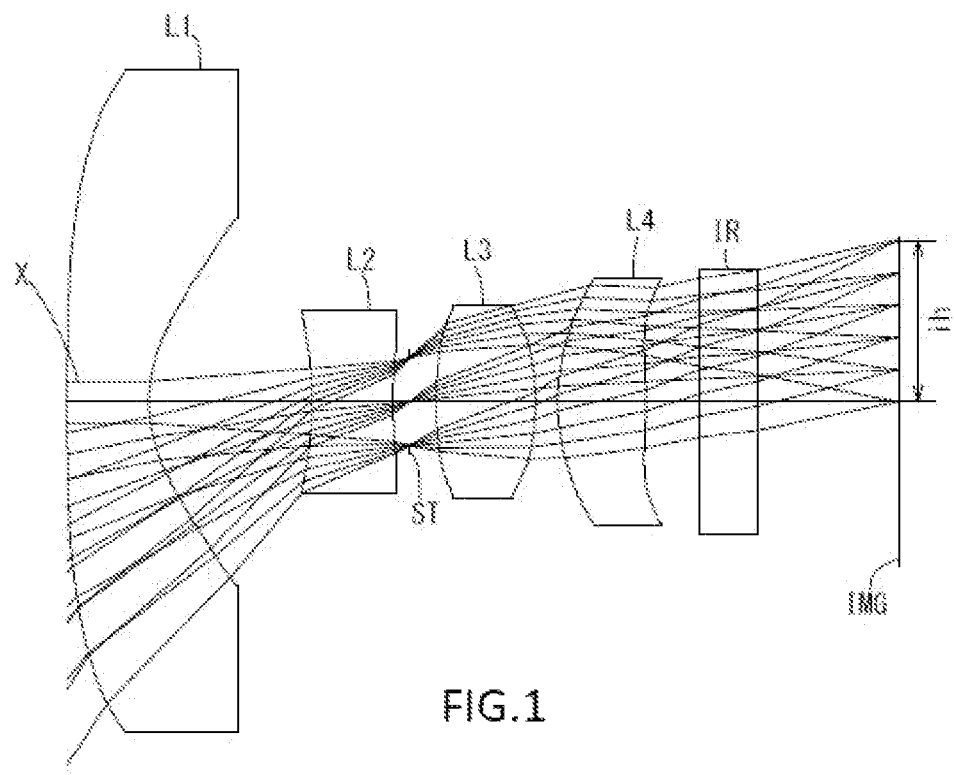
FIG. 1 is a schematic view showing an imaging lens in Example 1 according to the present invention.
Figure 3:
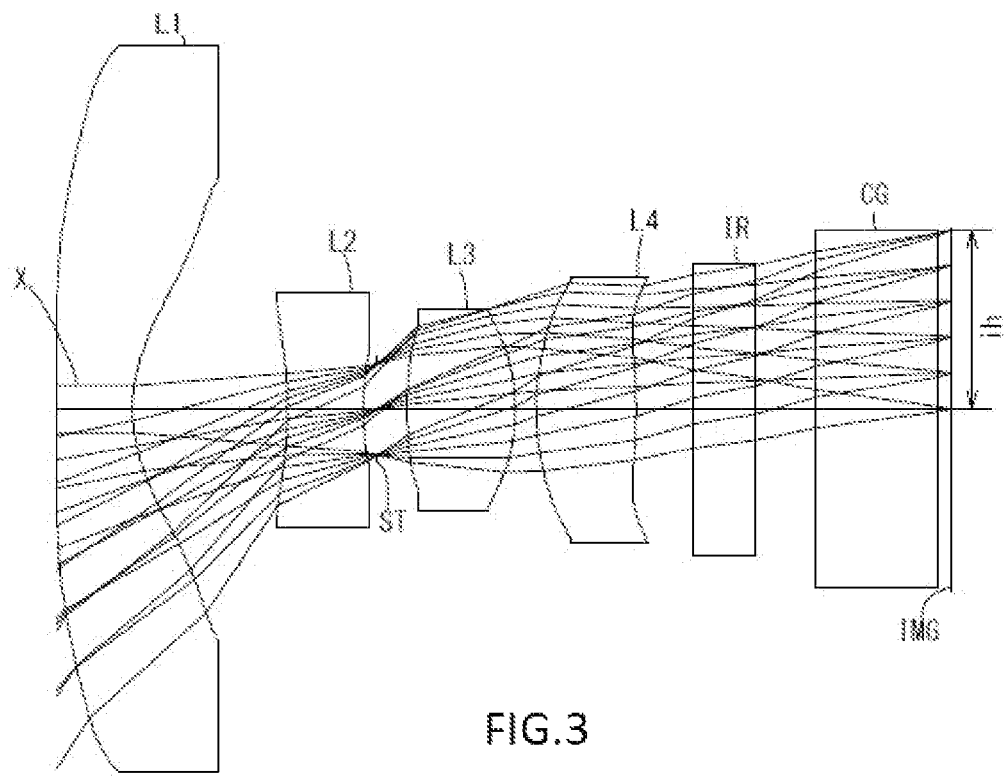
FIG. 3 is a schematic view showing an imaging lens in Example 2 according to the present invention.
Figure 5:
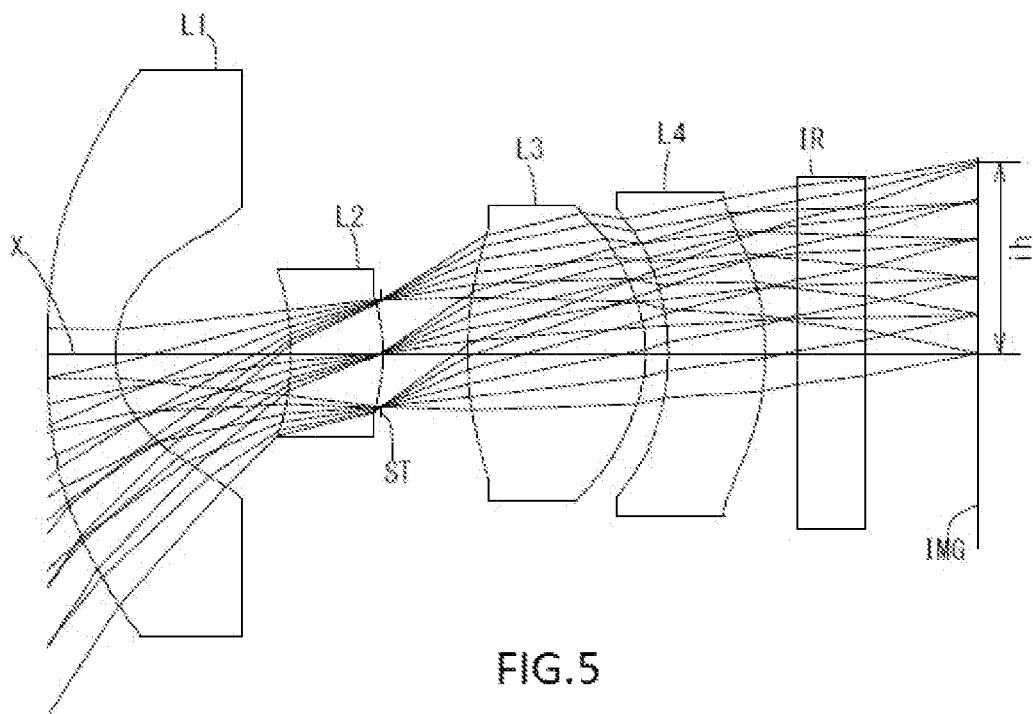
FIG. 5 is a schematic view showing an imaging lens in Example 3 according to the present invention.

FIGS. 1, 3 and 5 are schematic views of the imaging lenses in Examples 1 to 3 according to the embodiments of the present invention, respectively.

The imaging lens according to the present invention comprises, in order from an object side to an image side, a first lens L1 with negative refractive power in a paraxial region, a second lens L2 with positive or negative refractive power having an object-side surface being concave in a paraxial region, a third lens L3 with positive refractive power having a biconvex shape with convex surfaces on the object side and the image side in a paraxial region, and a fourth lens L4 with positive refractive power having an image-side surface being convex in a paraxial region.

A filter IR such as an IR cut filter and a cover glass are arranged between the fourth lens L4 and an image plane IMG (namely, the image plane of an image sensor). The filter IR is omissible.

An aperture stop ST is arranged between the second lens L2 and the third lens L3, and downsizing in a diameter direction is facilitated.

The first lens L1 has the negative refractive power and the wide field of view is achieved. The first lens L1 is formed in a meniscus shape having an object-side surface being convex and an image-side surface being concave in a paraxial region (near the optical axis X). Therefore, spherical aberration and distortion can be properly corrected.

The first lens L1 may be formed in a biconcave shape having the object-side surface and the image-side surface being concave in a paraxial region (near the optical axis X) as in the Example 2 as shown in FIG. 3. In this case, chromatic aberration can be more properly corrected.

The second lens L2 has the negative refractive power and is formed in the biconcave shape having the object-side surface and the image-side surface being concave in the paraxial region. Therefore, the coma aberration, the field curvature and the distortion can be properly corrected.

The refractive power of the second lens L2 may be positive as in the Example 3 as shown in FIG. 5. This case is favorable for reduction in the profile.

The second lens L2 may be formed in a meniscus shape having the object-side surface being concave and the image-side surface being convex in the paraxial region (near the optical axis X) as in the Example 3 as shown in FIG. 5. In this case, the coma aberration and the distortion can be more properly corrected.

The third lens L3 has the positive refractive power and is formed in the biconvex shape having the object-side surface and the image-side surface being convex in the paraxial region. Therefore, reduction in the profile can be achieved, and the spherical aberration, the astigmatism and the distortion can be properly corrected.

The fourth lens L4 has the positive refractive power and is formed in the biconvex shape having the object-side surface and the image-side surface being convex in the paraxial region. Therefore, reduction in the profile can be achieved, and the coma aberration, the astigmatism, the field curvature and the distortion can be properly corrected. Furthermore, when the image-side surface is convex in the paraxial region, a light ray incident angle to an image sensor can be appropriately controlled. As a result, a lens diameter of the fourth lens can be small and reduction in the diameter of the imaging lens can be achieved.

Regarding the imaging lens according to the present embodiments, it is preferable that all lenses of the first lens L1 to the fourth lens L4 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (17).

$$1.60 < |r4|/T2 \tag{1}$$

$$2.10 < r5/f < 5.50 \tag{2}$$

$$-1.40 \leq f1/f4 < -0.01 \tag{3}$$

$$2.85 < D3/T3 < 12.00 \tag{4}$$

$$-3.50 < r3/|r4| < -0.10 \tag{5}$$

$$0.70 < |r7|/f < 5.50 \tag{6}$$

$$0.30 < |r7|/(T3+bf) < 2.20 \tag{7}$$

$$-1.00 < r2/r8 < -0.10 \tag{8}$$

$$8.00 < (T3/f) \times 100 < 40.00 \tag{9}$$

$$0.40 < r2/f < 2.50 \tag{10}$$

$$-6.50 < r3/f < -1.40 \tag{11}$$

$$-5.20 < r3/|r7| < -0.50 \tag{12}$$

$$10.00 < r5/T3 < 28.50 \tag{13}$$

$$-3.00 < |r7|/r8 < -0.10 \tag{14}$$

$$r8/D4 < -1.50 \tag{15}$$

$$-5.00 \leq f1/f < -0.90 \tag{16}$$

$$-1.20 \leq f1/|f2| < -0.15 \tag{17}$$

where

D3: a thickness along the optical axis X of the third lens L3,

D4 a thickness along the optical axis X of the fourth lens L4,

T2: a distance along the optical axis X from an image-side surface of the second lens L2 to an object-side surface of the third lens L3, T3: a distance along the optical axis X from an image-side surface of the third lens L3 to an object-side surface of the fourth lens L4, bf: a back focus, f: a focal length of the overall optical system of the imaging lens,
f1: a focal length of the first lens L1,
f2: a focal length of the second lens L2,
f4: a focal length of the fourth lens L4,
r2: a paraxial curvature radius of an image-side surface of the first lens L1,
r3: a paraxial curvature radius of an object-side surface of the second lens L2,
r4: a paraxial curvature radius of an image-side surface of the second lens L2,
r5: a paraxial curvature radius of an object-side surface of the third lens L3,
r7: a paraxial curvature radius of an object-side surface of the fourth lens L4, and
r8: a paraxial curvature radius of an image-side surface of the fourth lens L4.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a).

$2.00 < |r4|/T2 < 40.00$ (1a)

$2.50 < r5/f < 4.40$ (2a)

$-1.25 < f1/f4 < -0.03$ (3a)

$3.70 < D3/T3 < 10.00$ (4a)

$-2.60 < r3/|r4| < -0.30$ (5a)

$1.10 < |r7|/f < 4.00$ (6a)

$0.45 < |r7|/(T3+bf) < 1.90$ (7a)

$-0.65 < r2/r8 < -0.20$ (8a)

$13.00 < (T3/f) \times 100 < 30.00$ (9a)

$0.65 < r2/f < 2.00$ (10a)

$-5.80 < r3/f < -2.10$ (11a)

$-4.20 < r3/|r7| < -0.75$ (12a)

$13.00 < r5/T3 < 24.00$ (13a)

$-2.00 < |r7|/r8 < -0.20$ (14a)

$-18.00 < r8/D4 < -2.50$ (15a)

$-3.50 < f1/f < -1.40$ (16a)

$-1.00 < f1/|f2| < -0.25$ (17a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14 and A16 denote aspheric surface coefficients.

[Equation 1]
$$Z = \frac{\frac{H^2}{R}}{1 + \sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, examples of the imaging lens according to this embodiment will be explained. In each example, f denotes a focal length of the overall optical system of the imaging lens, Fno denotes an F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
|---|
| Unit mm | f = 0.39
Fno = 2.60
ω(°) = 57.0
ih = 0.59
TTL = 2.98

| Surface Data | | | | | |
|---|---|---|---|---|---|
| i | r | d | Nd | vd | |
| (Object) | Infinity | Infinity | | | |
| 1* | 50.0000 | 0.2980 | 1.544 | 55.86 | (vd1) |
| 2* | 0.5147 | 0.5973 | | | |
| 3* | −1.4839 | 0.2970 | 1.661 | 20.37 | (vd2) |
| 4* | 2.9679 | 0.0615 | | | |
| 5 (Stop) | Infinity | 0.0969 | | | |
| 6* | 1.3278 | 0.3637 | 1.535 | 55.61 | (vd3) |
| 7* | −1.4969 | 0.0800 | | | |
| 8* | 0.6018 | 0.3240 | 1.535 | 55.61 | (vd4) |
| 9* | −1.8867 | 0.2000 | | | |

TABLE 1-continued

| | | Example 1 | | |
|---|---|---|---|---|
| 10 | Infinity | 0.2100 | 1.517 | 64.20 |
| 11 | Infinity | 0.5195 | | |
| Image Plane | Infinity | | | |

ConstituentLens Data

| Lens | StartSurface | FocalLength | (Wavelength 850 nm) | Back Focus |
|---|---|---|---|---|
| 1 | 1 | −0.958 | bf | 0.858 |
| 2 | 3 | −1.459 | | |
| 3 | 6 | 1.377 | | |
| 4 | 8 | 0.894 | | |

Aspheric Surface Data

| | FirstSurface | Second Surface | Third Surface | Fourth Surface |
|---|---|---|---|---|
| k | 0.000000E+00 | −5.447892E−01 | 0.000000E+00 | 0.000000E+00 |
| A4 | 1.553795E−01 | −9.362214E−01 | −1.942157E+00 | 2.537426E+00 |
| A6 | −1.039458E−01 | −1.036175E+00 | 2.745899E+01 | 1.157926E+01 |
| A8 | 4.147333E−02 | −4.537294E−02 | −9.703166E+01 | 1.625506E+03 |
| A10 | 0.000000E+00 | 1.020947E+00 | 1.103522E+02 | −1.182447E+04 |
| A12 | 0.000000E+00 | 0.000000E+00 | 0.000000E+00 | 0.000000E+00 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | −8.999998E+01 | −2.135300E−01 | −8.998718E+01 |
| A4 | −1.211264E+00 | −1.174298E+01 | −5.485333E+00 | 1.495193E+00 |
| A6 | 3.270475E+01 | 1.254949E+02 | 5.621239E+01 | 4.540025E+00 |
| A8 | 9.319612E+00 | −1.028457E+03 | −3.291803E+02 | 7.691940E+01 |
| A10 | −9.170044E+02 | 5.109394E+03 | 1.054151E+03 | −6.369911E+02 |
| A12 | 0.000000E+00 | −6.500177E+03 | −1.545480E+03 | 1.118991E+03 |
| A14 | 0.000000E+00 | 0.000000E+00 | 0.000000E+00 | 0.000000E+00 |
| A16 | 0.000000E+00 | 0.000000E+00 | 0.000000E+00 | 0.000000E+00 |

Figure 2:
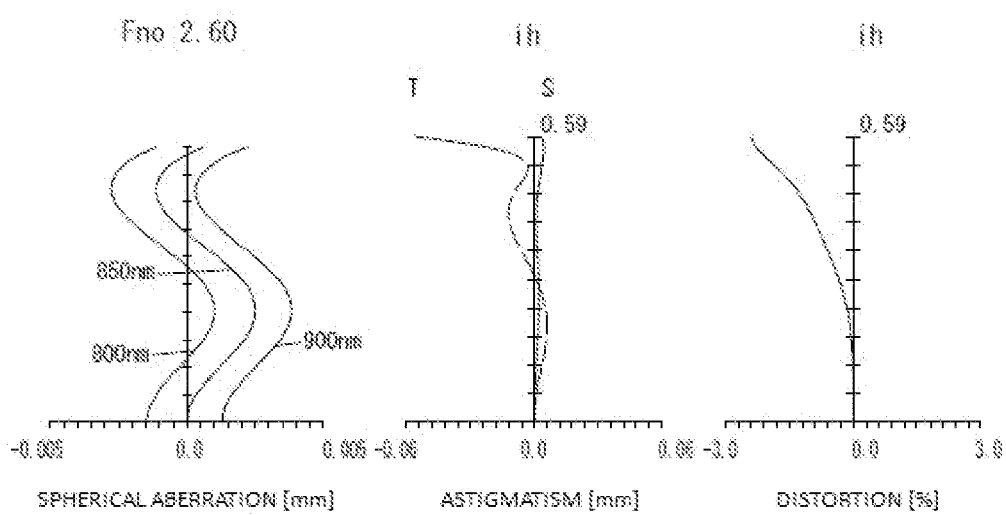
FIG. 2 shows spherical aberration, astigmatism, and distortion of the imaging lens in Example 1 according to the present invention.

The imaging lens in Example 1 satisfies conditional expressions (1) to (17) as shown in Table FIG. 2 shows spherical aberration (mm), astigmatism (mm), and distortion (%) of the imaging lens in Example 1. The spherical aberration diagram shows the amount of aberration at each wavelength of 800 nm, 850 nm, and 900 nm. The astigmatism diagram shows the amount of aberration at d-ray on a sagittal image surface S (solid line) and on tangential image surface T (broken line), respectively (same as FIGS. 4 and 6). As shown in FIG. 2, each aberration is corrected excellently.

Example 2

The basic lens data is shown below in Table 2.

TABLE 2

| | | Example 2 | | |
|---|---|---|---|---|
| | | Unit mm | | |
| | | f = 0.39 | | |
| | | Fno = 2.60 | | |
| | | ω(°) = 57.0 | | |
| | | h = 0.59 | | |
| | | TTL = 2.74 | | |

Surface Data

| i | r | d | Nd | vd | |
|---|---|---|---|---|---|
| (Object) | Infinity | Infinity | | | |
| 1* | −17.0643 | 0.2980 | 1.544 | 55.86 | (vd1) |
| 2* | 0.5283 | 0.5973 | | | |
| 3* | −1.9449 | 0.2970 | 1.661 | 20.37 | (vd2) |
| 4* | 1.4095 | 0.0615 | | | |
| 5 (Stop) | Infinity | 0.0969 | | | |
| 6* | 1.3278 | 0.3637 | 1.535 | 55.61 | (vd3) |
| 7* | −1.1399 | 0.0800 | | | |
| 8* | 0.6018 | 0.3240 | 1.535 | 55.61 | (vd4) |
| 9* | −1.5428 | 0.2000 | | | |

TABLE 2-continued

| | | Example 2 | | |
|---|---|---|---|---|
| 10 | Infinity | 0.2100 | 1.517 | 64.20 |
| 11 | Infinity | 0.5195 | | |
| 12 | Infinity | 0.4000 | 1.517 | 64.20 |
| Image Plane | Infinity | 0.0428 | | |

| ConstituentLens Data | | | | |
|---|---|---|---|---|
| Lens | StartSurface | FocalLength | (Wavelength 850 nm) | Back Focus |
| 1 | 1 | −0.937 | bf | 0.830 |
| 2 | 3 | −1.201 | | |
| 3 | 6 | 1.207 | | |
| 4 | 8 | 0.856 | | |

| Aspheric Surface Data | | | | |
|---|---|---|---|---|
| | FirstSurface | Second Surface | Third Surface | Fourth Surface |
| k | 0.000000E+00 | −6.558543E−01 | 0.000000E+00 | 0.000000E+00 |
| A4 | 3.359508E−01 | −1.356531E+00 | −2.828692E+00 | 2.202126E+00 |
| A6 | −3.123319E−01 | 5.541637E+00 | 3.255188E+01 | 1.934277E+02 |
| A8 | 1.038267E−01 | −4.424488E+01 | −2.066004E+02 | −1.021489E+04 |
| A10 | 6.088309E−03 | 1.342744E+02 | 3.099240E+03 | 3.047083E+05 |
| A12 | 0.000000E+00 | −1.826714E+02 | −2.613704E+04 | 6.735707E+05 |
| A14 | 0.000000E+00 | 9.487135E+01 | 7.320020E+04 | −7.392892E+07 |
| A16 | 0.000000E+00 | 0.000000E+00 | 0.000000E+00 | 0.000000E+00 |
| | Sixth Surface | Seventh Surface | Eighth Surface | Ninth Surface |
| k | 0.000000E+00 | −8.999998E+01 | −2.398328E−02 | −8.998718E+01 |
| A4 | −2.690882E+00 | −2.149588E+01 | −1.010096E+01 | −6.621282E−01 |
| A6 | 1.380315E+02 | 4.817369E+02 | 1.609144E+02 | 2.955513E+01 |
| A8 | −2.319342E+03 | −9.363184E+03 | −1.668190E+03 | −9.920950E+01 |
| A10 | 3.039122E+04 | 1.303491E+05 | 1.197695E+04 | 1.625805E+02 |
| A12 | −2.456228E+05 | −1.132902E+06 | −5.682645E+04 | −4.041392E+02 |
| A14 | 7.461257E+05 | 5.496640E+06 | 1.574265E+05 | 0.000000E+00 |
| A16 | 0.000000E+00 | −1.107194E+07 | −1.929246E+05 | 0.000000E+00 |

Figure 4:
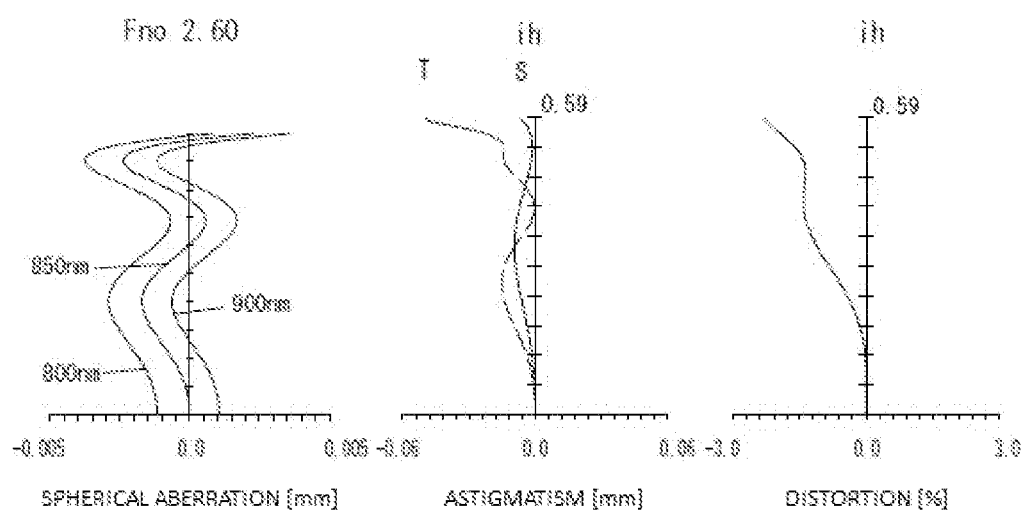
FIG. 4 shows spherical aberration, astigmatism, and distortion of the imaging lens in Example 2 according to the present invention.

The imaging lens in Example 2 satisfies conditional expressions (1) to (17) as shown in Table FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| | Example 3 | | | |
|---|---|---|---|---|
| | Unit mm | | | |
| | f = 0.39 | | | |
| | Fno = 2.60 | | | |
| | ω(°) = 57.0 | | | |
| | h = 0.59 | | | |
| | TTL = 2.81 | | | |

| Surface Data | | | | | |
|---|---|---|---|---|---|
| i | r | d | Nd | vd | |
| (Object) | Infinity | Infinity | | | |
| 1* | 2.5725 | 0.2100 | 1.535 | 55.61 | (vd1) |
| 2* | 0.3339 | 0.5430 | | | |
| 3* | −1.1038 | 0.2856 | 1.535 | 55.61 | (vd2) |
| 4* | −0.6373 | −0.0033 | | | |
| 5 (Stop) | Infinity | 0.2651 | | | |
| 6* | 1.1344 | 0.5500 | 1.535 | 55.61 | (vd3) |
| 7* | −0.4905 | 0.0696 | | | |
| 8* | −1.0321 | 0.3000 | 1.661 | 20.37 | (vd4) |

TABLE 3-continued

Example 3

| | | | | |
|---|---|---|---|---|
| 9* | −1.0554 | 0.1035 | | |
| 10 | Infinity | 0.2100 | 1.517 | 64.20 |
| 11 | Infinity | 0.3444 | | |
| Image Plane | Infinity | | | |

ConstituentLens Data

| Lens | StartSurface | FocalLength | (Wavelength 850 nm) | Back Focus |
|---|---|---|---|---|
| 1 | 1 | −0.742 | bf | 0.586 |
| 2 | 3 | 2.324 | | |
| 3 | 6 | 0.726 | | |
| 4 | 8 | 17.150 | | |

Aspheric Surface Data

| | FirstSurface | Second Surface | Third Surface | Fourth Surface |
|---|---|---|---|---|
| k | 6.437952E+00 | −4.985764E−01 | 0.000000E+00 | −9.648059E+00 |
| A4 | 7.069531E−01 | 1.486620E+00 | −1.563448E+00 | −5.529587E+00 |
| A6 | −1.496478E+00 | −1.151408E+01 | −3.731671E+01 | 6.167280E+00 |
| A8 | 1.420718E+00 | 2.475420E+02 | 4.826807E+02 | 1.640132E+03 |
| A10 | −5.991988E−01 | −1.354996E+03 | −2.574177E+03 | −2.896339E+04 |
| A12 | 1.311280E−06 | 0.000000E+00 | −2.150703E−08 | −2.150660E−08 |
| A14 | −2.137696E−06 | 0.000000E+00 | −6.591453E−09 | −6.592002E−09 |
| A16 | −1.971577E−09 | 0.000000E+00 | −2.020505E−09 | −2.020495E−09 |

| | Sixth Surface | Seventh Surface | Eighth Surface | Ninth Surface |
|---|---|---|---|---|
| k | 0.000000E+00 | −1.130428E−01 | 0.000000E+00 | 0.000000E+00 |
| A4 | 1.643079E−01 | −1.149646E+00 | −7.414130E+00 | −3.299955E+00 |
| A6 | 1.199271E+00 | 5.579617E+01 | 1.005148E+02 | 2.760265E+01 |
| A8 | −6.137518E+01 | −3.842439E+02 | −6.088168E+02 | −9.372794E+01 |
| A10 | 1.508339E+02 | 8.630140E+02 | 1.280674E+03 | 1.399977E+02 |
| A12 | 0.000000E+00 | −2.150241E−08 | −2.150470E−08 | −2.149174E−08 |
| A14 | 0.000000E+00 | −6.591845E−09 | −6.592141E−09 | −6.591326E−09 |
| A16 | 0.000000E+00 | −2.020525E−09 | −2.021018E−09 | −2.020843E−09 |

The imaging lens in Example 3 satisfies conditional expressions (1) to (17) as shown in Table 4.

Figure 6:
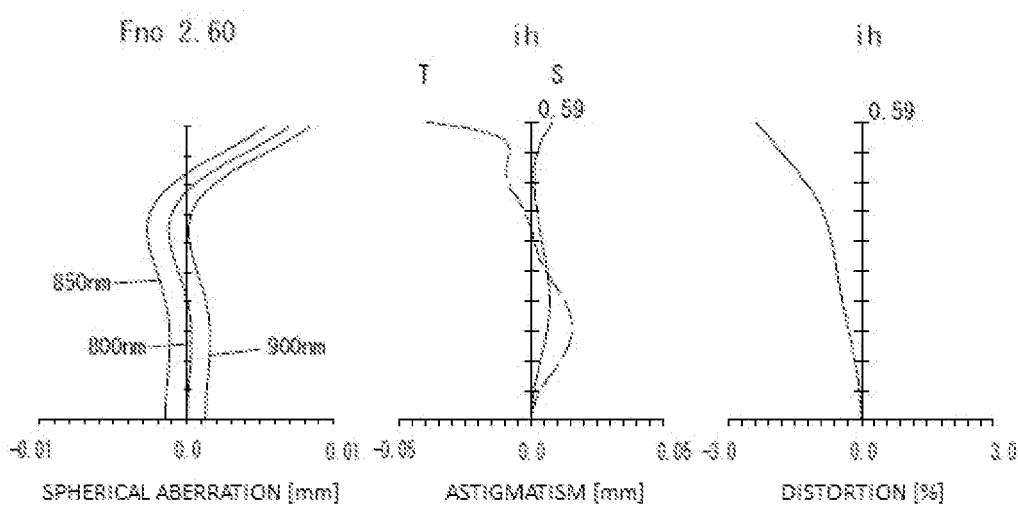
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

In table 4, values of conditional expressions (1) to (17) related to the Examples 1 to 3 are shown.

TABLE 4

| | Conditonal Expressions | Example 1 | Example 2 | Example 3 |
|---|---|---|---|---|
| (1) | $|r4|/T2$ | 18.74 | 9.71 | 2.43 |
| (2) | $r5/f$ | 3.36 | 3.36 | 2.87 |
| (3) | $f1/f4$ | −1.07 | −1.10 | −0.04 |
| (4) | $D3/T3$ | 4.55 | 5.05 | 7.90 |
| (5) | $r3/|r4|$ | −0.50 | −1.38 | −1.73 |
| (6) | $|r7|/f$ | 1.52 | 1.52 | 2.62 |
| (7) | $|r7|/(T3 + bf)$ | 0.64 | 0.67 | 1.57 |
| (8) | $r2/r8$ | −0.27 | −0.34 | −0.32 |
| (9) | $(T3/f) \times 100$ | 20.27 | 17.73 | 17.64 |
| (10) | $r2/f$ | 1.30 | 1.34 | 0.85 |
| (11) | $r3/f$ | −3.76 | −4.93 | −2.80 |
| (12) | $r3/|r7|$ | −2.47 | −3.23 | −1.07 |
| (13) | $r5/T3$ | 16.60 | 18.97 | 16.30 |
| (14) | $|r7|/r8$ | −0.32 | −0.39 | −0.98 |
| (15) | $r8/D4$ | −5.82 | −4.66 | −3.52 |
| (16) | $f1/f$ | −2.43 | −2.37 | −1.88 |
| (17) | $f1/|f2|$ | −0.66 | −0.78 | −0.32 |

When the imaging lens according to the present invention is adopted to a product with the camera function, there is realized contribution to a wide field of view of the camera and also high performance thereof.

DESCRIPTION OF REFERENCE NUMERALS

ST: aperture stop
L1: first lens
L2: second lens
L3: third lens
L4: fourth lens
ih: maximum image height
IR: filter
CG: cover glass
IMG: imaging plane

What is claimed is:
1. An imaging lens comprising in order from an object side to an image side,
   a first lens with negative refractive power in a paraxial region,
   a second lens with positive or negative refractive power having an object-side surface being concave in a paraxial region,
   a third lens with positive refractive power having a biconvex shape with convex surfaces on the object side and the image side in a paraxial region, and
   a fourth lens with positive refractive power having an image-side surface being convex in a paraxial region, wherein the following conditional expressions (1), (2'), (3), (9'), (13"), and (15') are satisfied:

$$1.60 < |r4|/T2 \quad (1)$$

$$2.87 < r5/f < 3.36 \quad (2')$$

$$-1.40 < f1/f4 < -0.01 \quad (3)$$

$$17.64 < (T3/f) < 20.27 \quad (9')$$

$$16.30 <= r5/T3 <= 18.97 \quad (13'')$$

$$r8/D4 <= -3.25 \quad (15')$$

where r4: a paraxial curvature radius of an image-side surface of the second lens, T2: a distance along an optical axis from an image-side surface of the second lens to an object-side surface of the third lens, r5: a paraxial curvature radius of an object-side surface of the third lens, f: a focal length of the overall optical system of the imaging lens, f1: a focal length of the first lens, f4: a focal length of the fourth lens, T3: a distance along the optical axis from an image-side surface of the third lens to an object-side surface of the fourth lens, r8: a paraxial curvature radius of an image-side surface of the fourth lens, and D4: a thickness along the optical axis of the fourth lens.

2. The imaging lens according to claim 1, wherein the following conditional expression (4) is satisfied:

$$2.85 < D3/T3 < 12.00 \quad (4)$$

where

D3: a thickness along the optical axis of the third lens, and

T3: a distance along the optical axis from an image-side surface of the third lens to an object-side surface of the fourth lens.

3. The imaging lens according to claim 1, wherein the following conditional expression (5) is satisfied:

$$-3.50 < r3/|r4| < -0.10 \quad (5)$$

where r3: a paraxial curvature radius of an object-side surface of the second lens, and r4: a paraxial curvature radius of an image-side surface of the second lens.

4. The imaging lens according to claim 1, wherein the following conditional expression (6) is satisfied:

$$0.70 < |r7|/f < 5.50 \quad (6)$$

where r7: a paraxial curvature radius of an object-side surface of the fourth lens, and f: a focal length of the overall optical system of the imaging lens.

5. The imaging lens according to claim 1, wherein the following conditional expression (7) is satisfied:

$$0.30 < |r7|/(T3+bf) < 2.20 \quad (7)$$

where r7: a paraxial curvature radius of an object-side surface of the fourth lens, T3: a distance along the optical axis from an image-side surface of the third lens to an object-side surface of the fourth lens, and bf: a back focus.

6. The imaging lens according to claim 1, wherein the following conditional expression (8) is satisfied:

$$-1.00 < r2/r8 < -0.10 \quad (8)$$

where r2: a paraxial curvature radius of an image-side surface of the first lens, and r8: a paraxial curvature radius of an image-side surface of the fourth lens.

* * * * *